United States Patent [19]
Vinouze et al.

[11] Patent Number: 5,326,420
[45] Date of Patent: Jul. 5, 1994

[54] MACHINE FOR ASSEMBLING LIQUID CRYSTAL CELLS

[75] Inventors: Bruno Vinouze, Port-Blanc; René Baumes, Franconville, both of, France

[73] Assignees: France Telecom Etablissement Autonome De Droit Public, Paris; Societe D'Applications Generales D'Electricite et de Mecanique Sagem, Paris Cedex, both of France

[21] Appl. No.: 25,113

[22] Filed: Mar. 2, 1993

[30] Foreign Application Priority Data

Mar. 3, 1992 [FR] France .................. 92 02515

[51] Int. Cl.$^5$ .................................. B32B 31/00
[52] U.S. Cl. ........................ 156/379; 156/64; 156/285; 156/275.5; 156/382; 156/379.8; 156/556
[58] Field of Search ............. 156/379, 382, 556, 286, 156/285, 64, 275.5, 379.8

[56] References Cited

U.S. PATENT DOCUMENTS

| | | | |
|---|---|---|---|
| 4,700,474 | 10/1987 | Choinski | 156/382 |
| 4,923,552 | 5/1990 | Fukushima et al. | |
| 4,944,908 | 7/1990 | Leveque et al. | 156/150 |
| 5,094,709 | 3/1992 | Eichelberger | 156/382 |
| 5,106,441 | 4/1992 | Brosig et al. | 156/382 |

FOREIGN PATENT DOCUMENTS

WO87/01651  3/1987  PCT Int'l Appl. ............ 156/382

OTHER PUBLICATIONS

Patent Abstracts of Japan, vol. 13. No. 527, (P-965)(3875), AN-63-42753, Nov. 24, 1989, JP-A-12 16 317, Aug. 30, 1989.
Patent Abstracts of Japan, vol. 15, No. 395, (P-1260), Oct. 7, 1991, JP-A-31 57 615, Jul. 5, 1991.
Patent Abstracts of Japan, vol. 8, No. 82, (P-268)(1519), Apr. 14, 1984, AN-57-108565, JP-A-59 000 131, Jan. 5, 1984.

*Primary Examiner*—David A. Simmons
*Assistant Examiner*—Chester T. Barry
*Attorney, Agent, or Firm*—Oblon, Spivak, McClelland, Maier & Neustadt

[57] ABSTRACT

The machine includes a frame (11) and a film (12) for one of two substrates (1, 2) to be pressed onto the other under a plate (4). It is then possible to polymerize by points a glue joint (3) so as to assemble the two substrates. Accurate displacement means (7, 8, 9, 10) and observation means (13, 14, 15) are also provided. Application for the embodiment of liquid crystal cells.

12 Claims, 5 Drawing Sheets

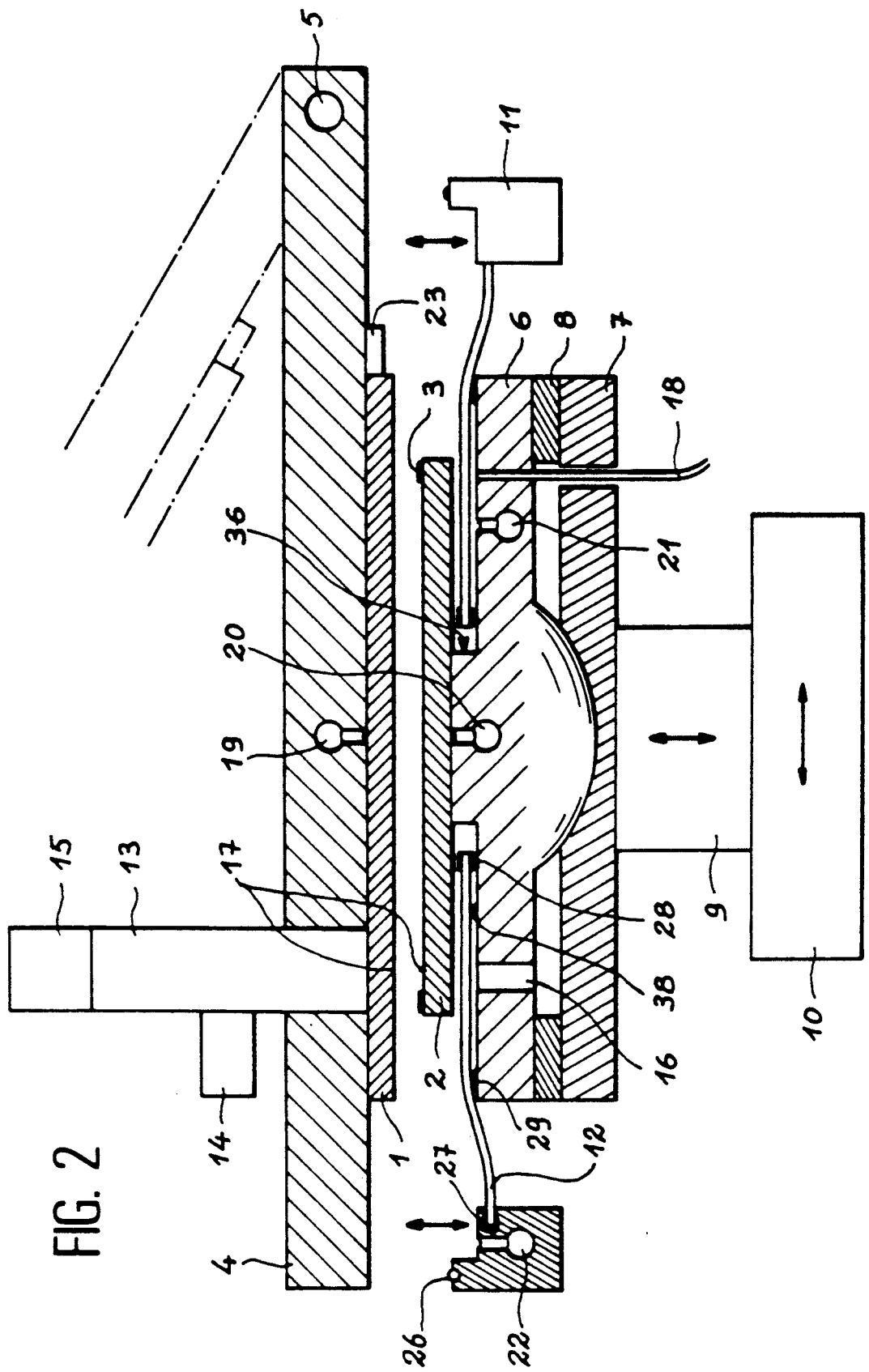

MACHINE FOR ASSEMBLING LIQUID CRYSTAL CELLS

FIELD OF THE INVENTION

The present invention concerns a machine for assembling liquid crystal cells.

BACKGROUND OF THE INVENTION

One of the major stages for the production of a liquid crystal cell is the assembling of a first glass plate coated with a counter-electrode generally made of ITO (indium and tin oxide) with a second glass plate supporting etched patterns, these patterns constituting a matrix of display points or pixels. A glue joint disposed at the periphery of the first plate ensures the fixing of the two plates. Microballs provide a spacing of several microns between the two plates. This spacing is then filled with liquid crystals.

Generally speaking, an assembling machine is constituted as shown on FIGS. 1a-1d. These figures include (cf. FIG. 1a) an electrode carrier EC and a counter-electrode carrier CEC, both carriers being provided with prepositioning slugs. The first plate CE equipped with its counter-electrode and the glue joint UV and the second plate E equipped with its electrodes and spacers are positioned on the CEC and EC supports (FIG. 1b). Each of the two plates is kept in position via suction on its plate carrier. An arm B is provided so as to return the first plate CE and superimpose it on the second plate (FIG. 1c).

After alignment, the counter-electrode plate is laid on the electrode plate. Suction, which was keeping the first plate glued to the arm, is suppressed and the arm is brought back to an idle position (FIG. 1d).

After having cut suction under the electrode plate E, the cell may be disposed, the latter needing to then undergo polymerization of the glue by means of pressing under vacuum and being exposed to ultraviolet rays.

This type of machine does not enable one plate to be uniformly pressed onto the other plate and do not enable the glueing operation to take place in situ. In fact, if the two plates are properly placed opposite each other, they are not glued to each other at this stage. Therefore, it is necessary to have another working station, which implies an unloading of the preassembled cell followed by loading into a frame for under-vacuum pressing and isolation from the glue under ultraviolet rays. These multiple operations systematically result in having alignment defects.

Furthermore, these machines of the prior art do not make it possible to carry out a precise alignment of one plate onto the other plate at the time of preassembling. Now, in order to assemble a counter-electrode having an optical mask with an electrode having the shape of an active matrix, it is essential to know that the positioning precision is about several microns. Therefore, it is vital to have available means allowing for the precise alignment of marks located on the two plates.

SUMMARY OF THE INVENTION

The object of the present invention is to overcome these drawbacks. With this end in view, the invention concerns a machine allowing for a uniform pressing of the two plates, namely of one onto the other independently of the geometric defects these plates may exhibit. By virtue of this advanced pressing, it is possible by means of points to polymerize the glue joint in situ without having to unload the cell in order to bring it into another working station. Furthermore, the machine of the invention uses advanced observation means and extremely fine displacement means making it possible to obtain an improved alignment of the plates of the cell.

All these objectives are attained via the use of means, taken separately or in combination, consisting of:
- a flexible film maintained by a peripheral frame, said film via suction picking up via below the lower plate so as to plate it on the upper plate held by a supporting table,
- isolation means acting by points on a glue joint disposed at the periphery of the smallest plate through a support plate when the two plates are pressed against each other by the flexible film,
- an observation optical device and step motors acting on movement of the plate and enabling the alignment of one plate to be finely adjusted onto the other plate.

BRIEF DESCRIPTION OF THE DRAWINGS

FIG. 2 shows a cutaway general view of the machine of the invention, the plate being placed above the supporting table.

DETAILED DESCRIPTION OF THE PREFERRED EMBODIMENTS

In the following description, the plates coated with their counter-electrode or electrodes shall be denoted as "substrates" without this designation implying any limitation concerning the exact nature of the electrodes or their composition. These two substrates are respectively given the references 1 and 2.

Figure 1A:
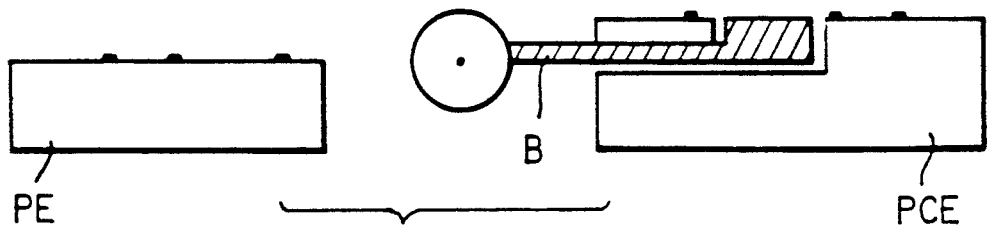
FIGS. 1a, 1b, 1c and 1d, already described, show an assembling machine conforming to the prior art.
Figure 1B:
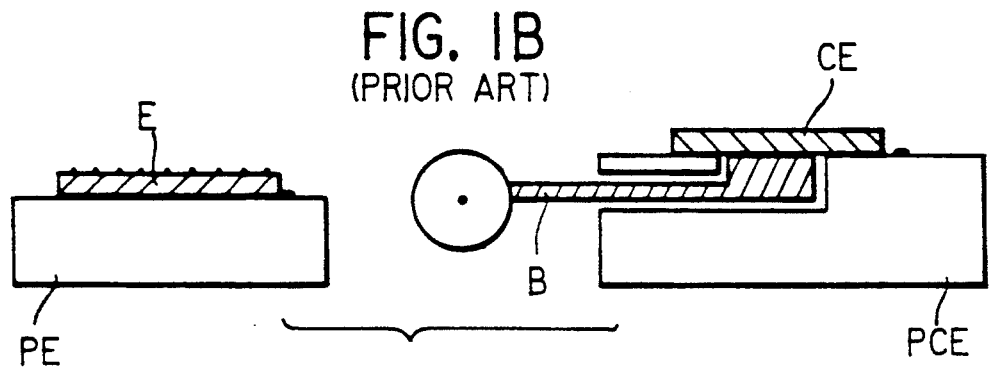
Figure 1C:
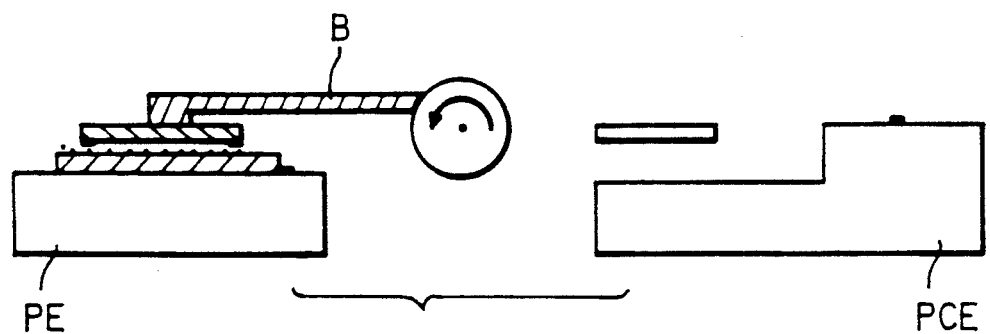
Figure 1D:
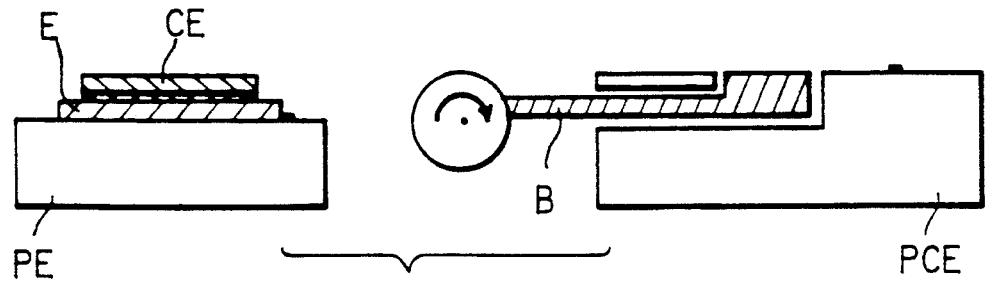
Figure 3:
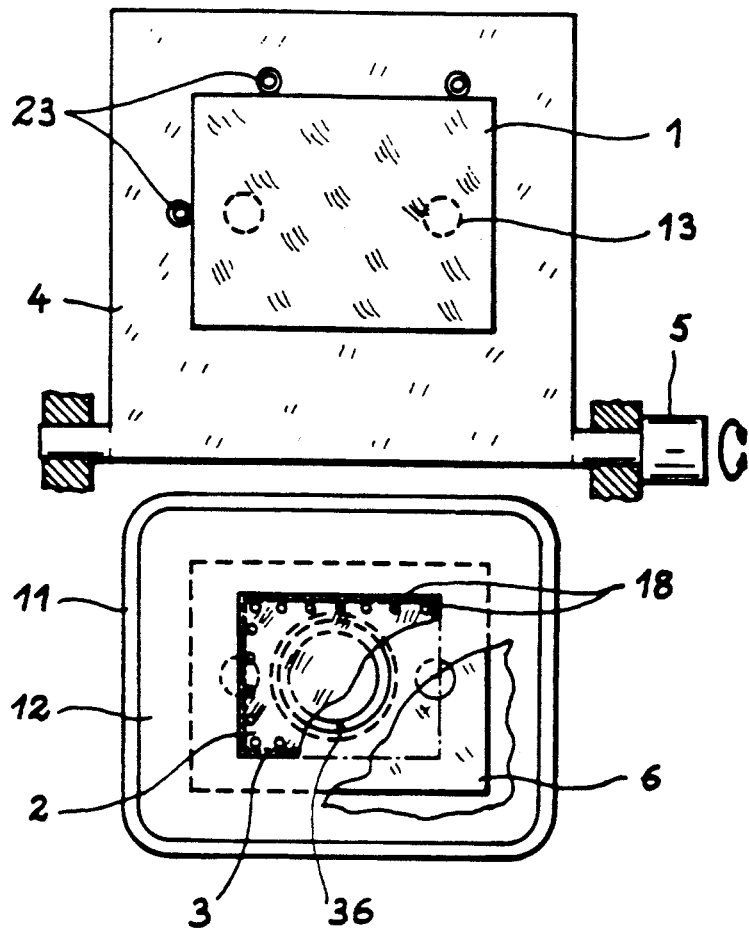
FIG. 3 is a top cutaway view diagrammatically showing the supporting table and plate side by side.
Figure 5:
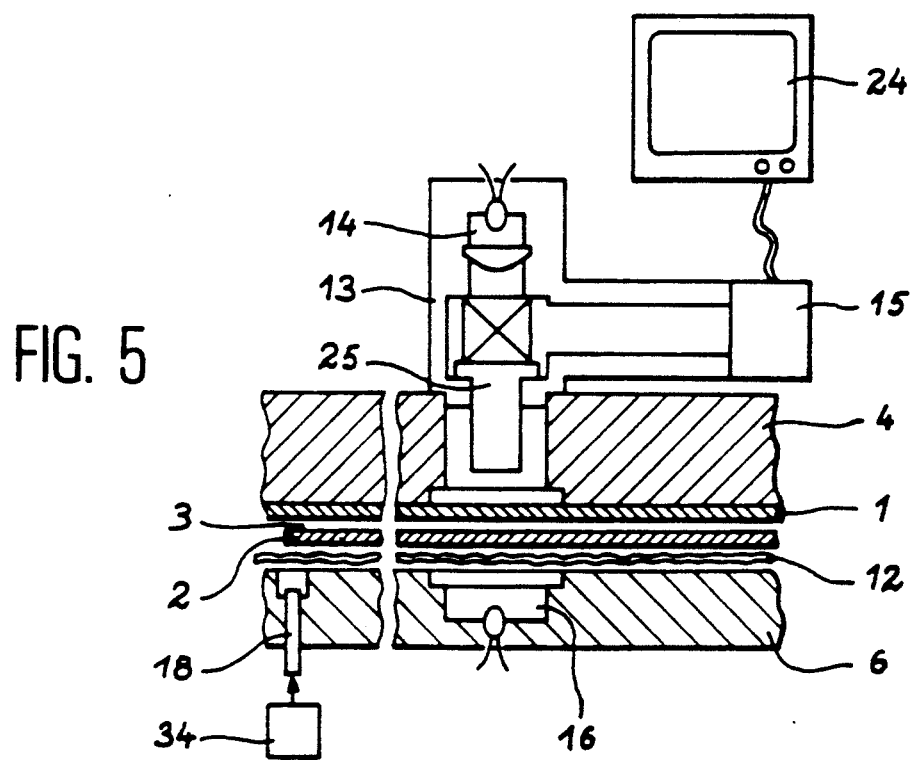
FIG. 5 shows details of the isolation and observation means.

As shown on FIGS. 2, 3 and 5, the largest of the two substrates 1 is prepositioned with the aid of three stops able to be adjusted by cams 23 on a flat plate 4 whose dimensions are clearly larger. Holding is effected by suction by means of a grid of small grooves distributed under the entire surface of the substrate and a suction device 19. This plate is brought into a working position after loading of the first substrate via a rotation of 180 degrees so as to cover the second substrate 2 which is held in the same way on a mechanism plate 6 but via a surface reduced to a minimum. In practice, this surface is that of a central cylinder 36, the mechanism plate further including a peripheral horizontal flexure 38 (the shape of the mechanism plate is shown more clearly on FIGS. 4a to 4f).

The mechanism plate is rotary-flexible with respect to two horizontal axes and fixed with respect to the vertical axis by means of a spherical bearing 7 and horizontal position recall springs 8. The center of rotation is situated at the center of the upper substrate 1 and on its upper face.

The second substrate 2 is prepositioned with the aid of an adjustable template once the supported substrate has been removed.

The two substrates each bear two additional alignment patterns situated in non-functional zones. The center distance of the axes of these patterns is maximum so as to increase precision of positioning.

Corresponding to these patterns, housings are located in the mechanism plate 6 and the plate 4, said housings receiving observation systems 13, 14 and 15 shown in more detail on FIG. 5. Each observation system is mainly constituted (cf. FIG. 5) by a lens 25, a camera 15 with its monitor 24 and two lighting systems, one being a reflected lighting system 14 and the other a back lighting system 16.

When the plate 14 is in its loading position, the reflected lighting system makes it possible to visualize the patterns and adjust the position of the substrate so as to have them at the center of the optical field. In the working position, it is the back lighting system which is used as it allows for better contrasts. The field depth of the lens enables the patterns to be displayed prior to being placed in contact.

The relative positioning of the two substrates is effected via movement inside the horizontal plane of the piece 7 supporting the mechanism plate. A vertical movement 9 enables the two substrates to be placed in contact. The spherical bearing 7 permits a self-alignment in parallelism with an extremely slight force of disturbance of equilibrium due to the recall springs 8.

With a system with step motors coupled to a pulse control, movement sensitivity of 1 micron is obtained without having to manually intervene on the mechanical portion of the machine.

The portion of the mechanism plate not used for holding the substrate 2 is slightly lowered by the horizontal flexure 38 mentioned above so as to be able to insert a flexible film 12. This film may comprise on the surface an irregular relief with hollows and bosses with a pitch of close to one millimeter. It is possible, for example, to use an embossed film.

This film is contained by a frame 11 (whose left and right portions are shown on FIG. 2). This frame 11 is situated under the plate 4 and can be plated under this plate and at its periphery. Imperviousness of the plate 4/frame 11 contact is ensured by a flexible joint 26. Suction means 22 are also provided in the frame 11.

The central portion of the flexible film 12 is perforated over a diameter 40 of about 50 mm. This opening allows for passage of the central cylinder 36 of the mechanism plate 6 and supporting of the substrate 2 on this mechanism plate. Suction of the substrate 2 on the mechanism plate 6 is ensured by means 20, both during assembling of the plates and until pressing.

The edge 40 of the central hole of the film 12 is fitted on each face with a smooth layer forming a joint 28. This joint allows for good film/mechanism plate imperviousness at the time the substrate 2 is prepositioned. On pressing, this joint 28 shall ensure imperviousness at the back of the substrate so as to place the cell in a vacuum.

Finally, the mechanism plate 6 comprises a joint 29 close to the perimeter of the upper substrate 1, as well as a suction device 21 situated under the film 12.

In the loading position, the frame 11 is lowered and the film 12 is sucked on the mechanism plate 6 by the means 21 so as to avoid touching the substrate 2.

In the adjustment position, the film is no longer sucked on the mechanism plate by the means 21 and the frame is in the top position.

When positioning has been completed, a vacuum is created in the space limited by the plate 4, film 12 and substrate 2 by the means 22. By virtue of its geometry, the film is slowly pressurized under the substrate 2 until the joint of the central edge 28 provides imperviousness. At this moment, pumping places the entire cell under a vacuum and the substrate 2 is pressed against the substrate 1. Suction of the substrate 2 on the mechanism plate 6 is then suppressed and then the mechanism plate 6 is slightly lowered so as to destroy any action of the rigid mechanical parts on the cell (excluding the plate 4). The cell is then ready for polymerization of the holding glue.

The two substrates forming the cell are held together by a glue cord 3 situated at the smallest periphery of the two substrates (at the periphery of the substrate 2 in the example shown).

The glue used partially polymerizes under the action of ultraviolet rays. So as to complete the assembling operation, the glue is isolated by points by means of a beam of optical fibers 18 shown clearly on FIG. 5. These fibers transmit rays derived from an ultraviolet source 34. The isolated points are distributed over the glueing circumference.

The plate 4 is brought from the loading position into the working position via one rotation of a half-turn created by a rotary jack 5, as shown on FIG. 3. It is rendered immobile in this position by means of bolts (not shown), such as small jacks.

An electronic system enables the cycle of assembling operations to be partially automated, thus managing and executing most of the elementary operations. These operations are:
  suction of the film 12 on the mechanism plate 6,
  suction of the substrate 1 against the plate 4,
  suction of the substrate 2 on the mechanism plate 6,
  rotation of the plate 4 so as to have it return onto the mechanism plate 6,
  locking of the plate 4,
  releasing the film 12 and mounting of the frame 11, adjustment at X, Y and at an angle during approach and the placing in contact,
  suction between the plate 4 and the film 12 and pressing of the two substrates,
  releasing of the substrate 2 by halting suction 20,
  lowering of the mechanism plate 6,
  isolation from ultraviolet rays by points of the glue 3,
  unlocking and opening of the plate 4 by means of rotation,
  releasing the assembled cell fixed to the plate 4.

The functioning of the machine shall be more readily understood from a reading of the chronological description of the operations shown on FIGS. 4a to 4f.

Figure 4A:
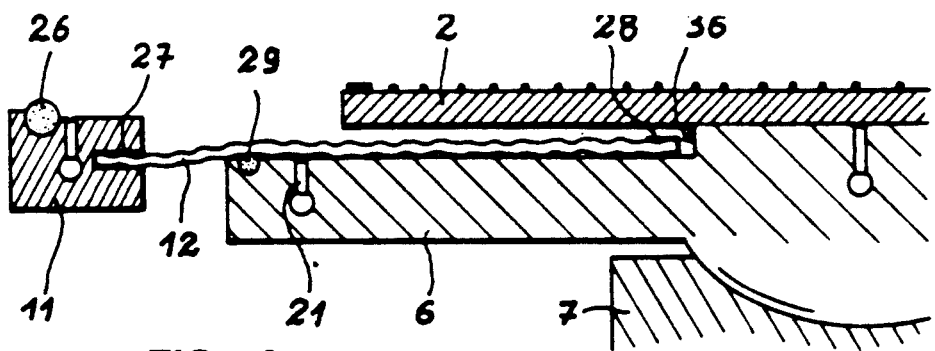
FIGS. 4a to 4f show the various stages of functioning of the machine.

1. The substrate and its spacers are positioned on the plate 4 by taking support on the slugs 23. A command activates suction under this substrate and at the same time suction of the film 12 on the mechanism plate 6 (FIG. 4a). It is then possible to observe on the display screen 24 via the camera 15 that the alignment patterns of the electrode are properly placed inside the optical field.

2. Then the substrate 2 and its glue joint are positioned on the mechanism plate 6, by means of a mobile square. A command activates suction of this substrate followed by ccutting of the vacuum under the film 12.

Figure 4B:
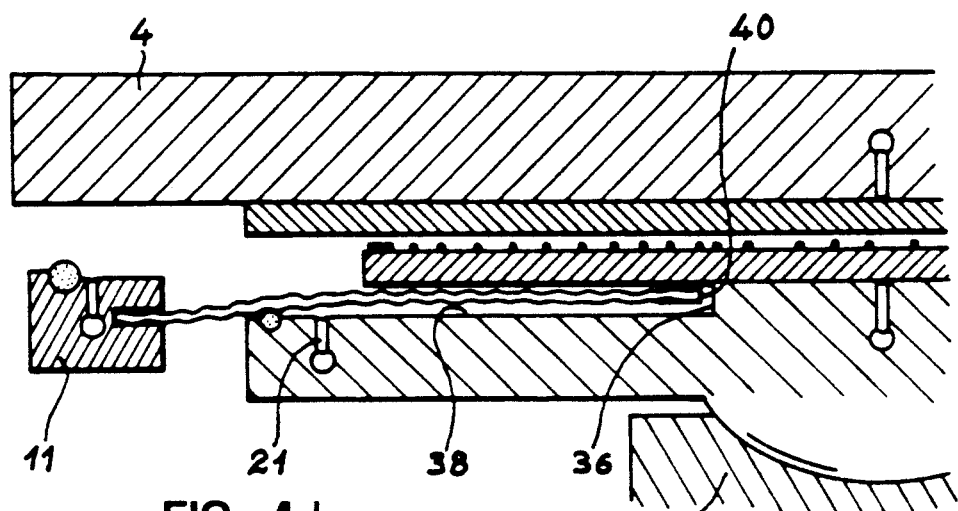

3. A command activates rotation of the plate 4 so as to superimpose the two substrates (FIG. 4b).

Figure 4C:
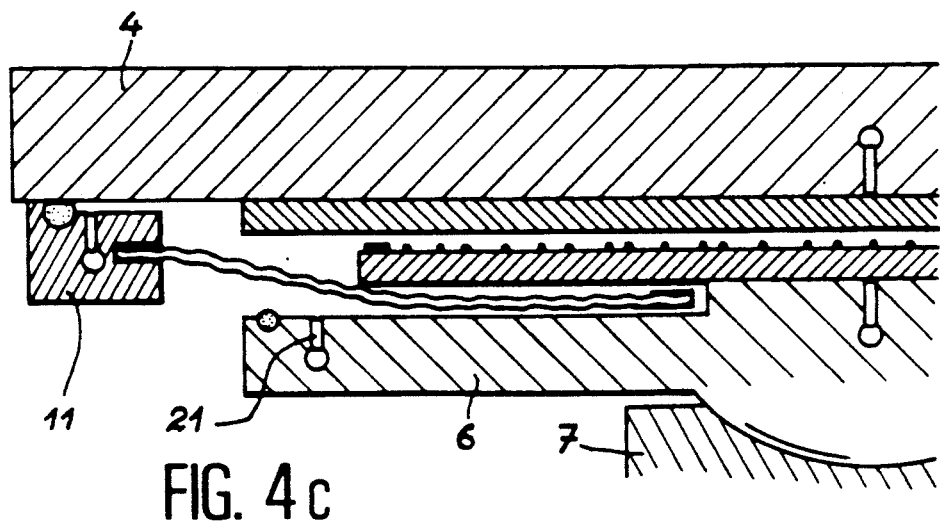
Figure 4D:
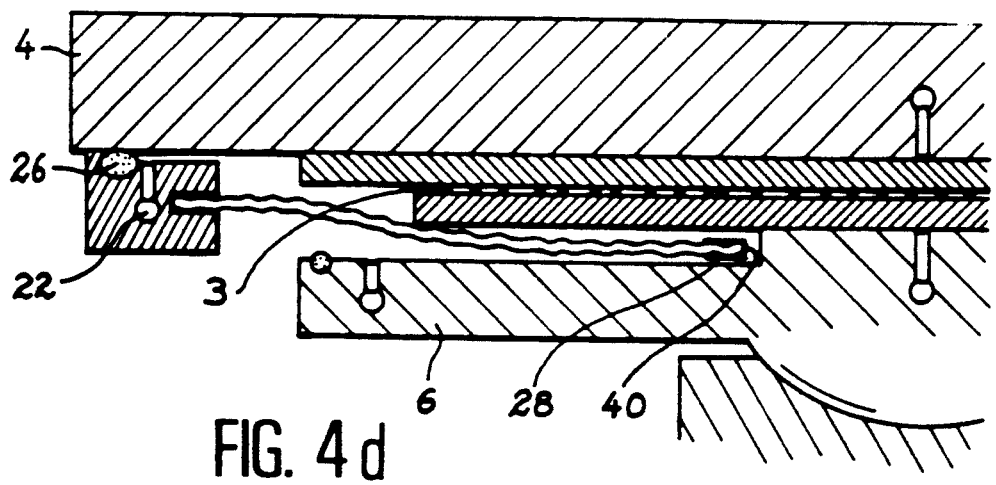
Figure 4E:
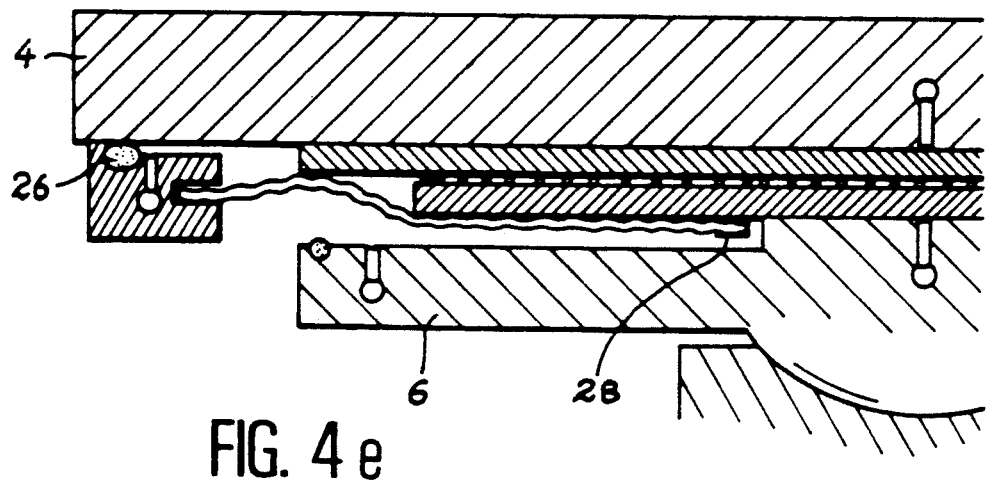
Figure 4F:
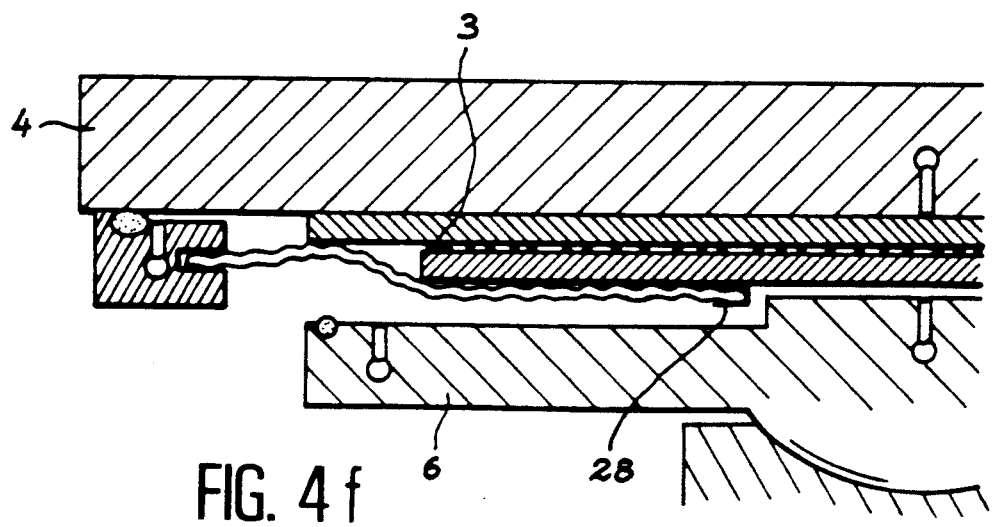

4. With the aid of a motor, the table 9 rises so as to bring the first substrate into contact with the second substrate whilst embodying the alignment of the two substrates by means of step motors at X, Y and in rotation. When the two substrates are in contact, a command makes the frame 11 bearing the film rise in contact with the plate 4 (FIG. 4c and 4d). Alignment is then possibly rectified. Then a command creates suction between the film 12 and the substrates so as to crush the glue joint 3 until the spacers carry out their allotted role (FIG. 4e). Finally, the vacuum under the substrate 2 is cut and the mechanism plate 6 lowers again by about 0.2 mm (FIG. 4f). The substrate 2 is then solely held by the film 12 with uniform pressure as the film marries the shape of the substrate. Differences of thickness of the substrate do not result in any differences of pressure on assembling. The lenticulation of the flexible film allows for good propagation of the vacuum as far as the central joint 28.

5. A command lights up the ultraviolet lamp 34 and the optical fibers 18 guide the radiation so as to locally isolate the glue 3. When polymerized in this way, the adhesive fixes the assembling of the two substrates 1 and 2.

6. For unloading, a command cuts the pressing vacuum 22, relowers the frame 11 and the mechanism plate 6, activates rotation of the plate 4 so as to bring it back into the idle position and cuts suction 19 of the upper substrate. The cell is then available to complete isolation of the glue in a single printed circuit type vacuum isolation frame.

It is easily possible to place the counter-electrode plate and its glue joint on the plate 4 and the electrode plate and its spacers on the mechanism plate 6. The only essential requirement is having the largest substrate on the plate 4.

What is claimed is:

1. Machine for assembling liquid crystal cells, wherein it includes:
    a) a mobile plate able to receive one first substrate of a cell to be assembled, said plate being provided with first suction means able to keep the first substrate positioned on the plate,
    b) a position-adjustable mechanism plate with one central portion able to receive a second substrate of the cell to be assembled and with a peripheral horizontal flexural providing a free space between the mechanism plate and the second substrate, said mechanism plate being provided with second suction means able to keep the second substrate positioned on the mechanism plate, and third suction means in the horizontal flexural,
    c) means to return the mobile plate and its first substrate so as to bring it above the mechanism plate with its second substrate, the first substrate thus being situated above the second substrate,
    d) a frame disposed around the mechanism plate and under the periphery of the mobile plate, this frame being provided at its upper portion with a gasket,
    e) means to move this frame vertically so as to bring to either a low position approximately at the level of the mechanism plate, or to an upper position so as to position it adjacent the mobile when the latter has returned above the mechanism plate,
    f) a flexible film with imperviousness means at its periphery fixed to the frame and pieces at its center with an opening corresponding to the central portion of the mechanism plate, said film, occupying the space provided between the horizontal flexure of the mechanism plate and the second substrate,
    g) fourth means for sucking in the volume between the mobile plate and the film, said film thus being able to be positioned on the horizontal flexure of the mechanism plate via the action of third suction means of the mechanism plate when the frame is in the low position, namely pressing on the first substrate second substrate unit via action of the fourth suction means when the frame is in the upper position, the second suction means of the mechanism plate having been rendered inoperable.

2. Machine according to claim 1, wherein the fourth suction means contained in the volume between the plate and the film for pressing the film onto the first and second substrates are disposed in the frame.

3. Machine according to claim 1, wherein the flexible film is embossed.

4. Machine according to claim 1, wherein the opening of the flexible film is circular and provided with means ensuring sealed contact with the rear of the second substrate during pressing of the film on the two substrates.

5. Machine according to claim 1, wherein the mechanism plate is mounted on position-adjustment means by a spherical bearing and a springs system.

6. Machine according to claim 5, wherein the adjustment means comprise a lifting table and a horizontal movement table.

7. Machine according to claim 6, wherein the horizontal movement table and the lifting table are controlled by stepper motors.

8. Machine according to any one of claims 1 to 7, wherein it further includes, inside and through the mechanism plate, means for isolating points of the circumference of the second substrate where a glue joint is disposed.

9. Machine according to claim 8, wherein the isolation means include at least one ultraviolet source and optical fibers guiding the ultraviolet light emitted by the source through the mechanism plate as far as the periphery of the second substrate.

10. Machine according to claim 1, wherein it further includes an observation system mounted on and through the mobile plate, said system allowing for observation at the periphery of the first and second substrates.

11. Machine according to claim 10, wherein the observation system includes reflected lighting means.

12. Machine according to claim 10, wherein the observation system includes back lighting means.

* * * * *